United States Patent [19]

Karasaki et al.

[11] Patent Number: 4,908,504
[45] Date of Patent: Mar. 13, 1990

[54] FOCUS DETECTING OPTICAL SYSTEM

[75] Inventors: Toshihiko Karasaki; Kazumi Sugitani, both of Osaka, Japan

[73] Assignee: Minolta Camera Kabushiki Kaisha, Osaka, Japan

[21] Appl. No.: 368,095

[22] Filed: Jun. 19, 1989

Related U.S. Application Data

[63] Continuation of Ser. No. 192,904, May 12, 1988, abandoned.

[30] Foreign Application Priority Data

May 15, 1987 [JP] Japan .................................. 62-119361

[51] Int. Cl.⁴ ................................................ G01J 1/20
[52] U.S. Cl. .................................. 250/201.2; 354/408
[58] Field of Search ............. 250/201 PF, 201 R, 204, 250/208, 209, 237 R; 356/406, 407, 408

[56] References Cited

U.S. PATENT DOCUMENTS

| | | | |
|---|---|---|---|
| 4,370,551 | 1/1983 | Fukuhara et al. | 250/201 |
| 4,766,302 | 8/1988 | Ishida et al. | 250/201 |
| 4,774,539 | 9/1988 | Suda et al. | 354/406 |
| 4,808,808 | 2/1989 | Karasaki et al. | 354/408 |

FOREIGN PATENT DOCUMENTS 60-32013  2/1985  Japan .

Primary Examiner—David C. Nelms
Attorney, Agent, or Firm—Burns, Doane, Swecker & Mathis

[57] ABSTRACT

A focus detecting optical system is disclosed which includes an objective lens for forming an image of an object, a plurality of focus detecting blocks, and a focus condition calculating device for calculating a focus condition of the objective lens in accordance with the light intensity distribution signals produced by the plurality of focus detecting blocks. Each of the focus detecting blocks includes a condenser lens located nearby a predetermined focal plane of the objective lens, a pair of image re-forming lenses located behind the condenser lens for reforming a pair of secondary images of the image formed by the objective lens, a mask plate having a pair of apertures through which light fluxes forming the secondary images pass and a light receiving unit for receiving the pair of the secondary images formed by the pair of image re-forming lenses to produce a light intensity distribution signal representative of the light intensity distribution of the secondary images. The apertures in the mask plate of at least one specified focus detecting block has a configuration different from that of the other focus detecting blocks.

5 Claims, 4 Drawing Sheets $d1a > d2a, d3a \qquad q1 \fallingdotseq q2 \fallingdotseq q3$ $d1b > d2b, d3b \qquad q1 \fallingdotseq q2 \fallingdotseq q3$

FOCUS DETECTING OPTICAL SYSTEM

This application is a continuation of application Ser. No. 07/192,904, filed May 12, 1988 now abandoned.

1. Field of the Invention

The present invention generally relates to a focus detecting optical system for multi-point focus detection.

2. Description of the Prior Art

Multi-area focus detection device has been known in which the focusing condition of an objective lens is detected not only with respect to an axial focus detection area located on the optical axis of the objective lens, but also with respect to a plurality of off-axial focus detection areas located far from the optical axis. In such multi-area focus detection area is spaced a distance from the axial focus detection area as far as possible, in order to avoid any possible interference between an axial light flux used for detecting the focusing condition in the axial focus detection area and an off-axial light flux is vignetted by the pupil of the objective lens, thereby posing a problem in that the focus detection capability is deteriorated with respect to the off-axial focus detection.

In order to avoid the above discussed problem, the focus detecting optical system of such a construction as shown in FIG. 8 is suggested. The illustrated focus detecting optical system has CCD (charge-coupled device) line sensors Po1 and Po2 adapted to receive off-axial light fluxes for the off-axial focus detection and an optical system for the passage of the off-axial light fluxes therethrough, said line sensors Po1 and Po2 and the optical system being arranged in a horizontal direction so that the off-axial light fluxes which are paired together are arranged lies in a sagittal direction of the objective lens TL, and thereby the vignetting of the off-axial light fluxes by the pupil of the objective lens can be avoided. In addition, the direction in which principal rays R3 and R4, R5 and R6 of each of the paired off-axial light fluxes are incident upon the field mask FM is so selected as to orient outwards at a predetermined angle relative to an optical axis (that is, the position of the off-axial light fluxes passing through the objective lens TL are directed towards the optical axis), thereby to avoid the possible vignetting of the off-axial light fluxes by the pupil of the objective lens.

According to the above described conventional focus detecting optical system, the direction in which the paired off-axial light fluxes lies in the sagittal direction of the objective lens TL and, also, the direction in which principal rays R3 and R4, R5 and R6 of each of the paired off-axial light fluxes are incident upon the field mask FM is so selected as to orient outwards at a predetermined angle relative to an optical axis thereby to avoid the possible vignetting of the off-axial light fluxes by the pupil of the objective lens. However, it has been found that, the complete removal of the possible vignetting of the off-axial light fluxes by the pupil of the photo-taking lens is not possible with respect to a plurality of interchangeable objective lenses having a plurality of aperture ratios (F-numbers) and a plurality of focal lengths.

SUMMARY OF THE INVENTION

Accordingly, the present invention has for its essential object to provide an improved focus detecting optical system wherein a very simple means is provided to avoid the possible vignetting of the off-axial light fluxes even when the objective lens is replaced with another interchangeable objective lens of a type having different characteristics (different F-numbers and different focal lengths) thereby to provide a highly accurate focus detectability.

In order to accomplish the above described object, the present invention provides a focus detecting optical system comprising an objective lens for forming an image of an object; a plurality of focus detecting blocks each including a condenser lens, located nearby a predetermined focal plane of the objective lens, a pair of image reforming lenses, located behind the condenser lens, for re-forming a pair of secondary images of the image formed by the objective lens, a mask plate having a pair of apertures through which light fluxes forming the secondary images pass, and a light receiving means for receiving the pair of the secondary images formed by the pair of image re-forming lenses to produce a light intensity distribution signal representative of the light intensity distribution of the secondary images, said apertures in the mask plate of at least one other focus detecting block having a configuration different from that of the specified focus detecting blocks; and a focus condition calculating means for calculating a focus condition of the objective lens in accordance with the light intensity distribution signals produced by the plurality of the focus detecting blocks.

BRIEF DESCRIPTION OF THE DRAWINGS

This and other objects and features of the present invention will become clear from the following description taken in conjunction with preferred embodiments thereof with reference to the accompanying drawings in which like parts are designated by like reference numerals and in which:

FIG. 3 is a schematic diagram showing the respective shapes of paired aperture apertures in the aperture mask of FIG. 1 which are projected on an objective lens;

DETAILED DESCRIPTION OF THE EMBODIMENTS

Figure 1:
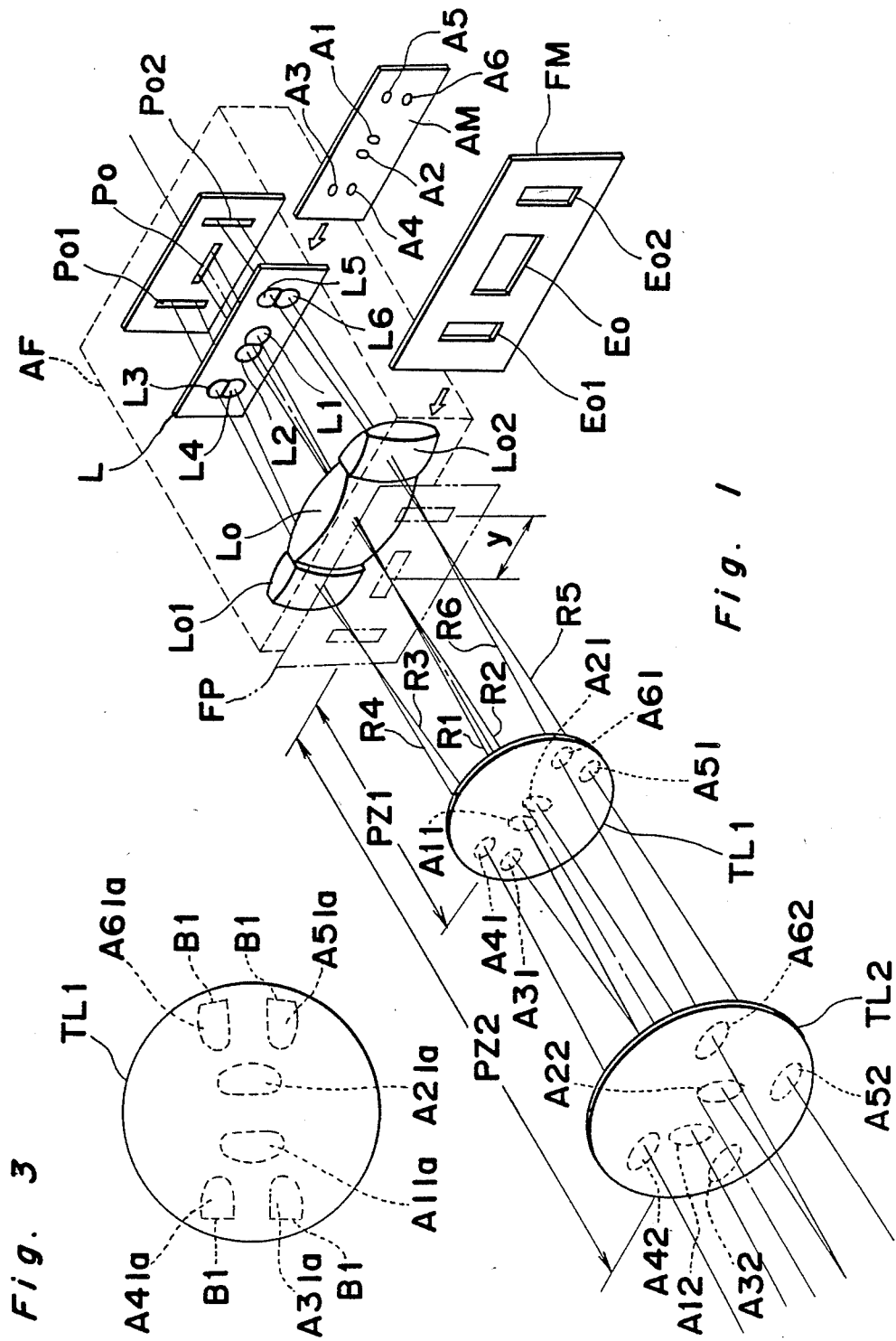
FIG. 1 is a schematic perspective view of a focus detecting optical system embodying the present invention.

Referring first to FIG. 1, a focus detecting optical system shown therein comprises an AF (auto-focus) sensor module shown as a phantom block AF. Objective lenses TL1 and TL2 are shown as positioned in front of the AF sensor module AF with respect to the direction of travel of rays of light towards the AF sensor module AF, particularly CCD line sensors Po, Po1 and Po2. The objective lenses TL1 and TL2 are spaced respective distances Pz1 and Pz2 from a predetermined focal plane FP, respectively, the distance Pz1 being smaller than the distance Pz2. (For the purpose of the description of the present invention, each of these distances Pz1 and Pz2 are referred to as "exit pupil distance".)

The AF sensor module AF includes a generally rectangular field mask FM disposed nearby the predetermined focal plane FP. The generally rectangular field mask FM has defined therein a generally rectangular horizontal opening Eo, extending in alignment with the longitudinal axis of the field mask FM, and a pair of generally rectangular vertical openings Eo1 and Eo2 positioned on respective sides of the horizontal opening Eo and extending perpendicular to the longitudinal axis of the field mask FM. Light fluxes passing respectively through the openings Eo, Eo1 and Eo2 travel through and converged by condenser lenses Lo, Lo1 and Lo2, respectively.

Positioned between the condenser lenses and the line sensors Po, Po1 and Po2 is a lens plate L. This lens plate L is of a generally rectangular shape and has defined therein a pair of image re-forming lenses L1 and L2, arranged in side-by-side fashion in alignment with the longitudinal axis of the lens plate L, and pairs of image reforming lenses L3 and L4, L5 and L6 defined on respective sides of the paired image re-forming lenses L1 and L2, the image re-forming lenses L3 and L4 or L5 and L6 of each pair being positioned one above the other in a direction perpendicular to the longitudinal axis of the lens plate L. Each of the image re-forming lenses L1 to L6 formed on the lens plate L is a planoconvex lens having the same radius of curvature and, therefore, one of the opposite surfaces of the lens plate L is flat while the other of the same is formed with projections equal in number to and aligned in position with the respective image re-forming lenses L1 to L6. A generally rectangular aperture mask AM having three sets of paired oval apertures A1 and A2, A3 and A4, A5 and A6 positioned frontwardly of, and held in contact with the flat surface of, the lens plate L with the paired apertures A1 and A2, A3 and A4, A5 and A6 aligned with the paired image re-forming lenses L1 and L2, L3 and L4, L5 and L6, respectively.

The CCD line sensors Po, Po1 and Po2 are all mounted on a generally rectangular substrate with the line sensor Po positioned between the line sensors Po1 and Po2 and also with the line sensor Po extending horizontally and perpendicular to any one of the line sensors Po1 and Po2. The carrier substrate for the CCD line sensors Po, Po1 and Po2 is so positioned behind the lens plate L that not only can the line sensors Po, Po1 and Po2 be aligned with the paired image re-forming lenses L1 and L2, L3 and L4, L5 and L6, respectively, but also the longitudinal axis of each of the line sensors Po, Po1 and Po2 can assume a parallel relationship with the direction in which the associated paired image re-forming lenses L1 and L2, L3 and L4, L5 and L6 adjoin with each other. With the CCD line sensors Po, Po1 and Po2 so supported and so positioned as hereinbefore described, each of the CCD line sensors Po, Po1 and Po2 is comprised of first and second rows of a plurality of light receiving elements, the first and second element rows being substantially continued in end-to-end fashion with each other so that images formed by the paired image re-forming lenses L1 and L2, L3 and L4, L5 and L6, respectively, can be projected onto the first and second element rows of the associated CCD line sensor Po, Po1 or Po2.

The focus detecting optical system of the above described construction works to detect the focus position in the following manner. The light flux for the off-axial focus detection area, that is, the off-axial light flux, containing the principal rays R3 and R4 travelling towards the field mask FM so as to pass away from the optical axis of the objective lens at a predetermined angle relative to the optical axis passes through the respective rectangular opening Eo1 in the field mask FM and then through the respective condenser lens Lo1. The off-axial light flux having passed through the condenser lens Lo1 is deflected by the condenser lens Lo1 so as to travel towards the optical axis and then projected onto the associated CCD line sensor Po1 through the paired apertures A3 and A4 in the aperture mask AM and the paired image re-forming lens L3 and L4 in the image re-forming lens plate L. In this way, paired images are re-formed on the CCD line sensors Po1. On the other hand, the other light flux for the other off-axial focus detection area, that is, the other off-axial light flux, containing the principal rays R5 and R6 travelling towards the field mask FM so as to pass away from the optical axis at the predetermined angle relative to the optical axis passes through the respective rectangular opening Eo2 in the field mask FM and then through the respective condenser lens Lo2 and are subsequently similarly projected onto the associated CCD line sensor Po2 through the paired apertures A5 and A6 in the aperture mask AM and the paired image re-forming lens L5 and L6 in the image re-forming lens plate L. In this way, paired images are re-formed on the CCD line sensors Po2.

The light flux for the axial focus detection area, that is, the axial light flux, containing principal rays R1 and R2 is, after having passed through the rectangular opening Eo, the condenser lens Lo, the paired apertures A1 and A2, and the paired image re-forming lenses L1 and L2, all aligned with the optical axis, converged on and projected onto the CCD line sensor Po, thereby to form the paired image thereon. By determining the positions of the paired images projected on the CCD line sensors Po, Po1 and Po2, the focusing condition of the objective lenses TL1 and TL2 can be detected.

Images A11 and A21, A31 and A41, A51 and A61 shown by the respective phantom lines as depicted on the photo-taking lens TL1 represent respective shapes of the paired apertures A1 and A2, A3 and A4., A5 and A6 in the aperture mask AM which are projected onto the objective lens TL1 through the associated condenser lenses Lo, Lo1 and Lo2. Similarly, images A12 and A22, A32 and A42, A52 and A62 shown by the respective phantom lines as depicted on the objective lens TL2 represent respective shapes of the paired apertures A1 and A2, A3 and A4, A5 and A6 in the aperture mask AM which are projected onto the objective lens TL2 through the associated condenser lenses Lo, Lo1 and Lo2. In other words, the phantom lines as depicted on each of the objective lenses TL1 and TL2 illustrate the range through which the light fluxes for the focus detection which would eventually pass through the paired apertures A1 and A2, A3 and A4, A5 and A6 have passed. Accordingly, if the images A11 and A21, A31 and A41, A51 and A61, or A12 and A22, A32 and A42, A52 and A62, of the paired apertures A1 and A2, A3 and A4, A5 and A6, fall within the aperture of the associated objective lens TL1 or TL2, the light fluxes which would eventually be projected onto the CCD line sensors Po, Po1 and Po2 will not be vignetted and, therefore, a high focus detectability can be obtained.

That under any circumstances the light fluxes which would eventually be projected onto the CCD line sensors Po1 and Po2 will not be vignetted means that, in a condition in which the distance Y measured from the principal rays R3 and R4, R6 and R6 of the respective off-axial light fluxes to the optical axis on the predetermined focal plane FP is large while the aperture of the objective lens is small relative to the distance from the CCD line sensors Po1 and Po2 to the optical axis, the off-axial light fluxes which would eventually be incident upon the CCD line sensors Po1 and Po2 can pass through the aperture of the objective lens TL no matter what value the exit pupil distance takes.

Figure 2:
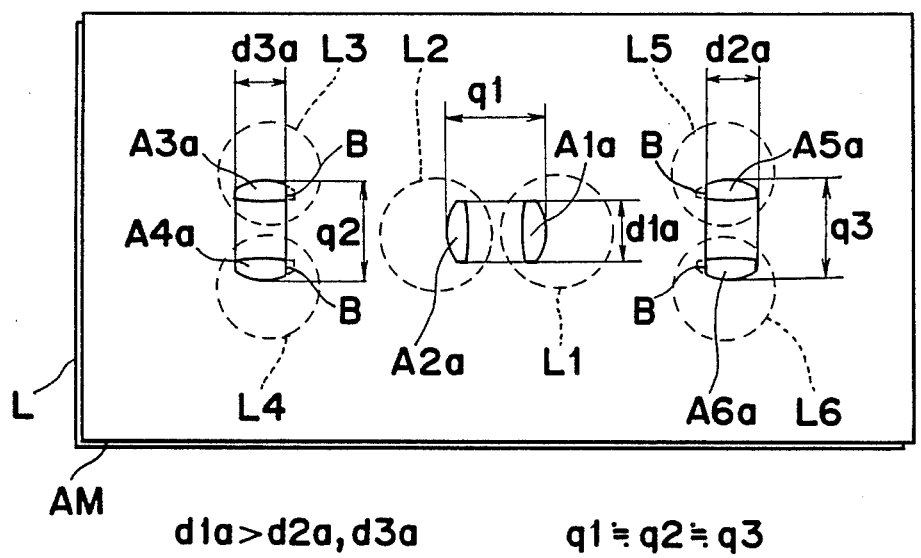
FIG. 2 is a schematic elevational view showing an aperture mask according to a preferred embodiment of the present invention.
Figure 4:
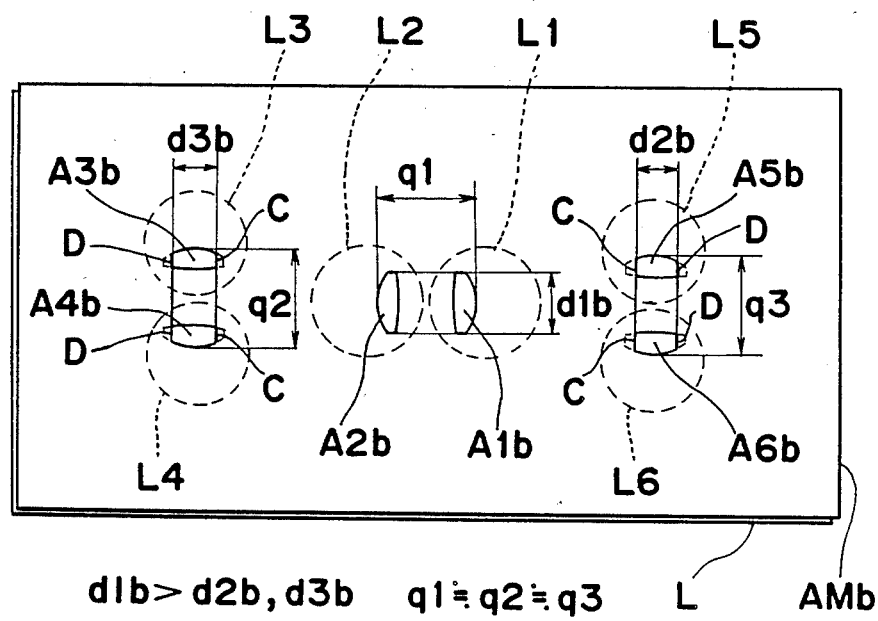
FIG. 4 is a schematic elevational view showing the aperture mask according to a second preferred embodiment of the present invention.
Figure 7:
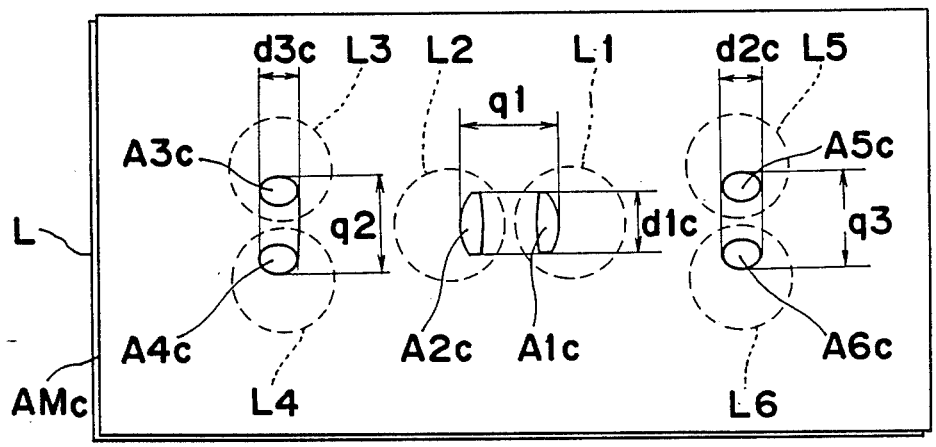
FIG. 7 is a schematic elevational view showing the aperture mask according to a third preferred embodiment of the present invention.
Figure 8:
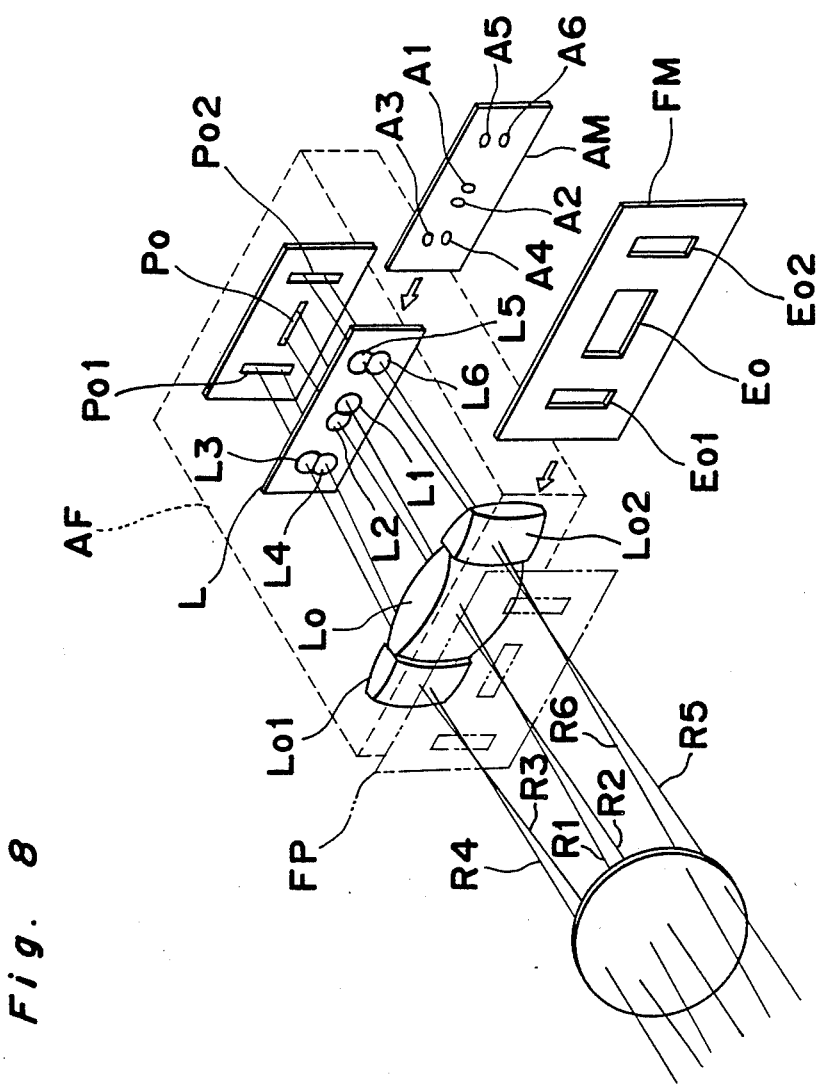
FIG. 8 a schematic perspective view showing the conventional focus detecting optical system.

FIGS. 2, 4 and 7 illustrate the aperture mask AM and the image re-forming lens plate L in overlapped relation to show the relationship in position between the paired apertures A1 and A2, A3 and A4, A5 and A6 and the associated image re-forming lenses L1 and L2, L3 and L4, L5 and L6 in the image re-forming lens plate L. Each of reference characters q1, q2 and q3 represents the outermost interval between the respective pair of the apertures A1 and A2, A3 and A4, A5 and A6 while each of reference characters d1, d2 and d3 represents the diameter of the respective pair of the apertures A1 and A2, A3 and A4, A5 and A6 as measured perpendicularly to a direction in which the paired apertures A1 and A2, A3 and A4, A5 and A6 are arranged. The maximum F-number of an objective lens, whose focusing condition can be detected, is determined by the respective values of the outermost intervals q1, q2 and q3 and the respective powers of the condenser lenses Lo, Lo1 and Lo2. In the illustrated instance, the condenser lenses Lo, Lo1 and Lo2 are so selected as to have an approximately equal power to each other and the outermost intervals q1, q2 and q3 are similarly so selected as to have an approximately equal value to each other, namely, $q1 \approx q2 \approx q3$. Also, in order to increase the illumination on the CCD line sensor Po, Po1 and Po2 thereby to lower the minimum limit of luminosity of the paired images by which the focusing condition can be detected, the paired apertures A1 and A2, A3 and A4, A5 and A6 are so shaped as to have large diameters d1, d2 and d3, respectively.

As a first embodiment of the present invention, reference will be made to the case in which the distance Y is large, the aperture of the objective lens TL is small and the exit pupil distance Pz is small (the objective lens TL1 having the exit pupil distance Pz1 is employed).

FIG. 2 illustrates the aperture mask AMa utilizable in conjunction with the objective lens TL1. Also, FIG. 3 illustrates the images of the paired apertures A1a and A2a, A3a and A4a, A5a and A6a of the aperture mask AMa which are optically projected onto the objective lens TL1. As shown in FIG. 2, the respective shape of the paired apertures A3a and A4a, A5a and A6a for the passage of the off-axial light fluxes is so selected that the diameter d2a and d3a thereof is reduced at an inside portion thereof as indicated by the phantom lines to a value smaller than that of the conventional shape thereby to provide a straight portion B and, on the other hand, to establish the following relationship.

$$d1a > d2a, d3a$$

Since the images A11a and A21a, A31a and A41a, A51a and A61a are projected through the predetermined focal plane FP, the relationship in position thereof relative to the associated paired apertures (for example, the paired apertures A3a and A4a) is such that the image of such paired apertures is inverted both vertically and horizontally with respect to the shape of the paired apertures. Accordingly, since the inside straight portion B of each of the paired apertures A3a and A4a, A5a and A6a is, when viewed in terms of the respective inverted images A31a and A41a, A51a and A61a of the paired apertures, included within the outer perimeter (straight portion B1) of the objective lens TL1, the inverted images A31a and A41a, A51a and A61a are encompassed by the objective lens TL1 wherefore the off-axial light fluxes will not be vignetted by the pupil of the objective lens TL1 thereby to accomplish a high focus detectability.

Figure 5:
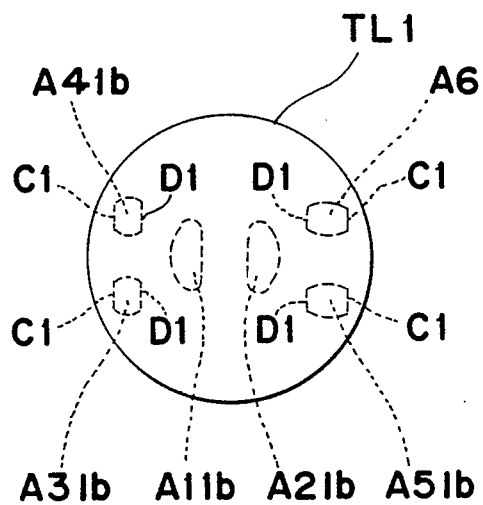
FIG. 5 is a schematic diagram showing the respective shapes of the paired apertures in the aperture mask of FIG. 4 which are projected on one of the photo-taking lenses.
Figure 6:
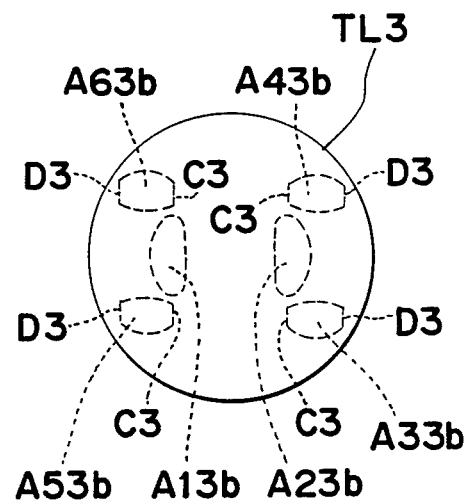
FIG. 6 is a schematic diagram showing the respective shapes of the paired apertures in the aperture mask of FIG. 4 which are projected on the other of the photo-taking lenses.

As a second embodiment of the present invention, the possibility will now be considered in which the objective lens TL1 having a small aperture and a small exit pupil distance Pz and the other objective lens TL3 (now shown, but positioned at a far side of the objective lens TL2) having a small aperture and a large exit pupil distance Pz are interchanged and used. FIG. 4 illustrates the aperture mask AMb utilizable when the objective lenses TL1 and TL3 are used, and FIG. 5 illustrates images A11b and A21b, A31b and A41b, A51b and A61b of the respective paired apertures A1b and A2b, A3b and A4b, A5b and A6b of the aperture mask AMb, which are optically projected onto the objective lens TL1. FIG. 6 illustrates images A13b and A23b, A33b and A43b, A53b and A63b of the respective paired apertures A1b and A2b, A3b and A4b, A5b and A6b of the aperture mask AMb which are optically projected onto the objective lens TL3. As shown in FIG. 4, the respective shape of the paired apertures A3b and A4b, A5b and A6b for the passage of the off-axial light fluxes is so selected that the diameter thereof is reduced at each of inside and outside portions thereof as indicated by the phantom lines to a value smaller than that of the conventional shape thereby to provide respective straight portions C and D and, on the other hand, to establish the following relationship.

$$d1b > d2b, d3b$$

Accordingly, as is the case with the above described first embodiment of the present invention, since the inside straight portion C of each of the paired apertures A3b and A4b, A5b and A6b is, when viewed in terms of the images A31b and A41b, A51b and A61b projected on the objective lens TL1, positioned at an outside as indicated by C1, the inverted images A31b and A41b, A51b and A61b are encompassed by the objective lens TL1 wherefore the off-axial light fluxes will not be vignetted by the pupil of the objective lens TL1. Also, as hereinbefore described, the principal rays R3 and R4, R5 and R6 of the off-axial light fluxes enters the field mask FM so as to pass away from the optical axis at the predetermined angle. Because of this, at a position sufficiently spaced from the AF module, the paired principal beams R3 and R4 and the paired principal rays R5 and R6 are inverted in position with respect to the optical axis. Accordingly, as shown in FIG. 6, the outside straight portion D of each of the paired apertures A3b and A4b, A5b and A6b is, when viewed in terms of the images A33b and A43b, A53b and A63b projected on the obfective lens TL3, positioned at an outside as indicated by D3, the inverted images A33b and A43b, A53b and A63b are encompassed by the objective lens TL3 wherefore the off-axial light fluxes will not be vignetted by the pupil of the objective lens TL3. Accordingly, even with the objective lens TL1 having the small aperture and the small exit pupil distance or the objective lens TL3 having the small aperture and the large exit pupil distance, the off-axial light fluxes will not be vignetted by the pupil of any one of the objective lenses TL1 and TL3, thereby to accomplishing a high focus detectability.

The aperture mask according to a third preferred embodiment of the present invention is illustrated by AMc in FIG. 7. In this third preferred embodiment, as is the case with any one of the first and second preferred embodiments, the diameter d3c of the paired apertures A3c and A4c, the diameter d2c of the paired apertures A5c and A6c and the diameter d1c of the paired apertures A1c and A2c are so selected as to establish the following relationship.

$$d1c > d2c, d3c$$

Also, the surface areas S1 and S2, S3 and S4, S5 and S6 of the respective paired apertures A1c and A2c, A3c and A4c, A5c and A6c are so selected to be substantially equal to each other and, as the same time, the illuminations on the respective CCD line sensors Po, Po1 and Po2 are so selected to be substantially equal to each other, thereby to make the minimum limit of luminosity of the paired images by which the focusing condition can be detected, equal to each other.

Although the present invention has fully been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

We claim:

1. A focus detecting optical system comprising: an objective lens for forming an image of an object; a plurality of focus detecting blocks each including a condenser lens, located nearby a predetermined focal plane of the objective lens, a pair of image re-forming lenses, located behind the condenser lens, for re-forming a pair of secondary images of the image formed by the objective lens, a mask plate having a pair of apertures through which light fluxes forming the secondary images pass, and a light receiving means for receiving the pair of the secondary images formed by the pair of image re-forming lenses to produce a light intensity distribution signal representative of the light intensity distribution of the secondary images, said apertures in the mask plate of at least one specified focus detecting block having a configuration different from that of the other focus detecting blocks; and a focus condition calculating means for calculating a focus condition of the objective lens in accordance with the light intensity distribution signals produced by the plurality of the focus detecting blocks.

2. The system as claimed in claim 1, wherein the at least one specified focus detecting block is provided for forming the pair of the secondary images of the image formed on the optical axis of the objective lens with respect to the image plane of the objective lens, and wherein the other focus detecting blocks are provided for forming the pair of the secondary images of the image formed on the off-axal regions of the objective lens with respect to the image plane of the objective lens.

3. The system as claimed in claim 2, wherein the diameter of the pair of the apertures as measured perpendicular to the direction in which the pair of the apertures are arranged in the other focus detecting blocks is different from that in the specified focus detecting block.

4. The system as claimed in claim 3, wherein the diameter in the specified focus detecting block is shorter than that in the other focus detecting blocks.

5. The system as claimed in claim 1, wherein the area of the pair of the apertures in the respective focus detecting blocks are substantially identical to each other.

* * * * *